United States Patent [19]

Adams et al.

[11] Patent Number: 5,006,598

[45] Date of Patent: Apr. 9, 1991

[54] WATER-DISPERSIBLE POLYESTERS IMPARTING IMPROVED WATER RESISTANCE PROPERTIES TO INKS

[75] Inventors: Linda J. Adams; George J. O'Neill, both of Kingsport, Tenn.

[73] Assignee: Eastman Kodak Company, Rochester, N.Y.

[21] Appl. No.: 513,724

[22] Filed: Apr. 24, 1990

[51] Int. Cl.$^5$ .............................................. C08L 67/00
[52] U.S. Cl. ................................... 524/601; 524/603; 524/604; 524/609; 524/513; 528/272; 528/295; 528/302; 528/308; 106/23; 106/24; 428/430; 428/458; 428/481; 428/483
[58] Field of Search ............... 528/272, 295, 302, 308; 524/601, 603, 604, 609, 513; 106/23, 24; 428/430, 458, 481, 483

[56] References Cited

U.S. PATENT DOCUMENTS

| | | | |
|---|---|---|---|
| 3,546,008 | 12/1970 | Shields et al. | 428/395 |
| 3,563,942 | 2/1971 | Heiberger | 524/602 |
| 3,734,874 | 5/1973 | Kibler et al. | 524/603 |
| 3,779,993 | 12/1973 | Kibler et al. | 528/295 |
| 4,145,469 | 3/1979 | Newkirk et al. | 428/245 |
| 4,148,779 | 4/1979 | Blackwell et al. | 524/221 |
| 4,152,485 | 5/1979 | Mizumara et al. | 428/425 |
| 4,233,196 | 11/1980 | Sublett | 524/602 |
| 4,304,900 | 12/1981 | O'Neill | 528/290 |
| 4,304,901 | 12/1981 | O'Neill et al. | 528/290 |
| 4,335,220 | 5/1982 | Coney | 523/414 |
| 4,340,519 | 7/1982 | Kotera et al. | 523/414 |
| 4,704,309 | 11/1987 | Coney et al. | 427/258 |
| 4,738,785 | 4/1988 | Langston | 210/738 |
| 4,772,491 | 9/1988 | Nealy et al. | 427/336 |
| 4,804,719 | 2/1989 | Weaver et al. | 525/420 |
| 4,847,316 | 7/1989 | Schick et al. | 524/88 |
| 4,855,344 | 8/1989 | Nealy et al. | 524/86 |
| 4,883,714 | 11/1989 | Stockl et al. | 428/412 |
| 4,912,157 | 3/1990 | Clark et al. | 524/265 |
| 4,916,177 | 4/1990 | Coney et al. | |

FOREIGN PATENT DOCUMENTS 62-21380  5/1987  Japan .

*Primary Examiner*—Morton Foelak
*Assistant Examiner*—Sam A. Acquah
*Attorney, Agent, or Firm*—Thomas R. Savitsky; William P. Heath, Jr.

[57] ABSTRACT

Disclosed are water-dispersible polyesters which impart improved water resistance and block resistance properties to printing inks. Typical polyesters contain about 90 to 97 mole % isophthalic acid, about 3 to about 10 mole % 5-sodiosulfoisophthalic acid, about 70 to about 85 mole % 1,4-cyclohexanedimethanol, and about 15 to about 30 mole % diethylene glycol, based on the total of all acid and hydroxy moiety repeating units being equal to 200 mole %.

28 Claims, No Drawings

WATER-DISPERSIBLE POLYESTERS IMPARTING IMPROVED WATER RESISTANCE PROPERTIES TO INKS

FIELD OF INVENTION

The present invention concerns certain water-dispersible polyesters containing specific amounts of repeating units of isophthalic acid, 5-sodiosulfoisophthalic acid, 1,4-cyclohexanedimethanol and diethylene glycol as well as printing inks prepared therefrom.

BACKGROUND OF THE INVENTION

Aqueous printing inks which use a water-dispersible or dissipatable polyester as, for example, a pigment carrier or binder, are known in the art as taught in, for example, U.S. Pat. Nos. 4,883,714; 4,847,316; 4,704,309; and 4,738,785. The polyesters described in these prior art patents require the presence of a poly(ethylene glycol) moiety (the definition of which includes diethylene glycol) as well as a metal sulfonate moiety attached to an aromatic nucleus. Inks containing such a polyester are known to have many desirable properties such as good adhesion to a variety of substrates and a wide viscosity range. Such inks are highly desirable in the art since they are aqueous or water-based and thus can avoid the use of large amounts of organic solvents.

However, because of the wide range of printing conditions and substrates used in the printing industry, a given ink formulation can have ideal properties for some applications and poor properties for other applications. We have found that printing inks prepared using specific polyesters exemplified in the above cited art have good water resistance properties on some substrates (for example, coated paper) but poor water resistance properties on other substrates (e.g., certain metals such as aluminum). There is a need in the art for polyesters which would impart improved water resistance properties to inks for substrates such as aluminum, while concurrently retaining other desirable properties. Also, there is a need in the art for aqueous inks having improved block resistance properties. We have unexpectedly discovered a new class of polyesters which meet the above-described needs of the art.

SUMMARY OF THE INVENTION

The present invention is directed to a linear, water-dissipatable polyester having an inherent viscosity of at least about 0.1 as measured in a 60/40 parts by weight solution of phenol/tetrachloroethane at 25° C. and at a concentration of 0.5 gram of polyester in 100 ml of solvent, the polyester containing substantially equimolar proportions of acid moiety repeating units (100 mole %) to hydroxy moiety repeating units (100 mole %), the polyester comprising repeating units of components (a), (b), (c) and (d), as follows wherein all stated mole percentages are based on the total of all acid and hydroxy moiety repeating units being equal to 200 mole %:

(a) about 90 to about 97 mole % isophthalic acid,
(b) about 3 to about 10 mole % 5-sulfoisophthalic acid,
(c) about 70 to about 85 mole % 1,4-cyclohexanedimethanol, and
(d) about 15 to about 30 mole % diethylene glycol.

The present invention is also directed to an ink composition or concentrate thereof comprising (A) about 4 to about 80 weight percent of at least one polyester of the invention,
(B) 0 to about 45 weight percent of at least one colorant, and
(C) about 15 to about 95 weight percent water.

DETAILED DESCRIPTION OF THE INVENTION

Although the polyesters of the present invention are within the general teachings of prior art polyesters known to be useful in printing inks, nothing in the prior art is present to teach or direct one to the novel polyesters of the invention and the surprising water resistance and block resistance properties such polyesters impart to inks.

Whenever the term "water-dissipatable" or "water-dispersible" is used in this description, it will be understood to refer to the activity of a water or aqueous solution on the applicable polymer. The term is specifically intended to cover those situations wherein the solution dissolves and/or disperses the polymer material therein and/or therethrough.

The polyesters of the present invention can be prepared in accordance with the methodology described in the Examples section of this disclosure and the prior art patents cited therein.

The term "repeating unit" of a particular component in the polyester of the invention means that repeating unit of the particular component known in the art to be incorporated into a polyester. Thus, a "1,4-cyclohexanedimethanol repeating unit" is a moiety of the structure:

a "isophthalic acid repeating unit" is a moiety of the structure:

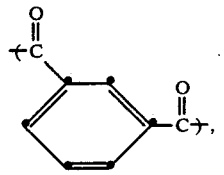

a "5-sulfoisophthalic acid repeating unit" is of the structure:

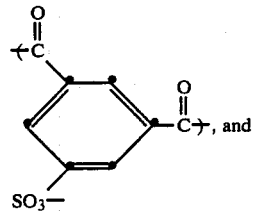

a "diethylene glycol repeating unit" is of the structure:

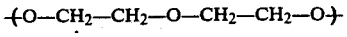

Therefore, any chemical derivative which will result in the desired repeating unit can be used to prepare the polyester of the present invention. For example, the corresponding acid anhydrides, esters, and acid chlorides (as well as the free diacids themselves) can be used as the particular starting material for incorporating the desired dicarboxylic acid repeating unit into the polyester. The total amount of acid moiety repeating units in the polyester of the present invention is 100 mole %. The acid moiety repeating unit in the polyester of the invention are components (a) and (b); therefore, the total mole percentage of components (a) plus (b) in the polyester is 100 mole %. Likewise, the total amount of hydroxy moiety repeating units in the polyester of the present invention is 100 mole %. The hydroxy moiety repeating units in the polyester of the invention are components (c) and (d); therefore, the total mole percentage of components (c) plus (d) in the polyester is 100 mole %. It follows then that the total of all acid moiety and hydroxy moiety repeating units in the polyester totals 200 mole %.

In the polyester, component (b), i.e., the 5-sulfoisophthalic acid, is typically in the form of a metallic sulfonate salt. The metal ion of the sulfonate salt group may be $Na^+$, $Li^+$, $K^+$, $Mg^{++}$, $Ca^{++}$, $Cu^{++}$, $Fe^{++}$, or $Fe^{+++}$. It is also possible that the sulfonate salt is non-metallic and can be a nitrogen-containing base as described in U.S. Pat. No. 4,304,901, incorporated herein by reference. The most preferred component or repeating unit is 5-sodiosulfoisophthalic acid.

The inherent viscosities (I.V.) of the particular water-dissipatable polyester materials of the invention are at least about 0.1 as determined according to ASTM D2857-70 procedure, in a Wagner Viscometer of lab Glass, Inc., of Vineland, N.J., having a ¼ mL capillary bulb, using a polymer concentration of about 0.5% by weight in 60/40 by weight of phenol/tetrachloroethane. It is preferred that the I.V. of the polyester is about 0.1 to about 1.0, more preferably about 0.2 to about 0.6. The procedure for determining I.V. is carried out by heating the polymer/solvent system at 120° C. for 15 minutes, cooling the solution to 25° C. and measuring the time of flow at 25° C. The I.V. is calculated from the equation $$(\eta) = \frac{\ln \frac{t_s}{t_o}}{C}$$

where:

$(\eta)$=inherent viscosity at 25° C. at a polymer concentration of 0.5 g/100 mL of solvent;

ln =natural logarithm;

$t_2$=sample flow time;

$t_o$=solvent-blank flow time; and

C=concentration of polymer in grams per 100 mL of solvent=0.5.

The units of the inherent viscosity throughout this application are in deciliters/gram.

Specific preferred polyesters of the invention include:
wherein component (a) is about 91 mole % isophthalic acid, component (b) is about 9 mole % 5-sodiosulfoisophthalic acid, component (c) is about 75 mole % 1,4-cyclohexanedimethanol, and component (d) is about 25 mole % diethylene glycol;

wherein component (a) is about 93 mole % isophthalic acid, component (b) is about 7 mole % 5-sodiosulfoisophthalic acid, component (c) is about 70 mole % 1,4-cyclohexanedimethanol, and component (d) is about 30 mole % diethylene glycol;

wherein component (a) is about 93 mole % isophthalic acid, component (b) is about 7 mole % 5-sodiosulfoisophthalic acid, component (c) is about 85 mole % 1,4-cyclohexanedimethanol, and component (d) is about 15 mole % diethylene glycol;

wherein component (a) is about 95 mole % isophthalic acid, component (b) is about 5 mole % 5-sodiosulfoisophthalic acid, component (c) is about 85 mole % 1,4-cyclohexanedimethanol, and component (d) is about 15 mole % diethylene glycol;

wherein component (a) is about 95 mole % isophthalic acid, component (b) is about 5 mole % 5-sodiosulfoisophthalic acid, component (c) is about 70 mole % 1,4-cyclohexanedimethanol, and component (d) is about 30 mole % diethylene glycol; and wherein component (a) is about 97 mole % isophthalic acid, component (b) is about 3 mole % 5-sodiosulfoisophthalic acid, component (c) is about 85 mole % 1,4-cyclohexanedimethanol, and component (d) is about 15 mole % diethylene glycol.

The term "ink" or "ink composition" is used herein in its broad sense as including the use thereof for coatings in all forms such as letters, patterns, and coatings without design, whether or not such coatings contain colorants such as pigments, and include finished inks, overprints, and primers.

In the ink compositions of the present invention, it is preferred that component (A) is present in an amount of about 5 to 90 weight percent, that component (B) is present in an amount of about 0 to 35 weight percent, and that component (C) is present in an amount of about 15 to 90 weight percent, more preferably 35 to 90 weight percent, such percentages being based on the total weight of components (A) through (C). If the ink composition is a finished ink, it is preferred that at least about 0.5 weight percent of colorant (component (B)) is present. More typically, in inks, at least about 1 weight percent of colorant is present, preferably at least about 5 weight percent. If the ink composition contains an organic pigment, typically such an organic pigment is present in an amount of about 17.5 weight percent or less of the total composition. If the ink composition contains an inorganic pigment, typically such inorganic pigment is present in an amount of about 50 weight percent or less of the total composition.

The ink compositions can optionally contain up to about 15 weight percent of the total composition, preferably up to about 3 weight percent, of one or more additional additives. Such additional additives include waxes such as Jonwax 26, Jonwax 120 (available from S. C. Johnson and Sons, Inc., Racine, Wis. 43403, U.S.A.), or Vanwax 35 (available from Vantage, Garfield, N.J. 07026); surfactants such as Surfynol 104 or Surfynol 440 (available from Air Products and Chemicals, Allentown, Pa. 18105), Carbowet 990 (available from Vantage), Aerosol TO-75 (available from American Cyanamid, Wayne, N.J. 07470); defoamers such as Foamaster 111 (available from Henkel Corporation, Morristown, N.J. 07960); alcohols containing 1 to 10 carbon atoms such as ethanol, methanol, n-propyl alcohol, or isopropyl alcohol; glycols such as ethylene glycol or propylene glycol; alcohol ethers such as propylene glycol monobutyl ether, ethylene glycol monobutyl ether, or propylene glycol monomethyl ether; biocides; pH stabilizers; thickeners such as Acrysol RM.825 (available from Rohm & Haas, Philadelphia, Pa. 19105); and the like.

Preferred amounts of certain additional additives in ink compositions of the present invention are set forth in the following table.

| Component | Weight Percent |
|---|---|
| Wax[a] | 0.0–3.0 |
| Surfactant[b] | 0.0–3.0 |
| Defoamer[c] | 0.0–2.0 |
| Alcohol[d] | 0.0–10.0 |

[a]e.g., Jonwax 26,120, Vanwax 35
[b]e.g., Surfynol 104,440
[c]e.g., Foamaster 111
[d]e.g., n-Propyl Alcohol, Isopropyl Alcohol It is especially preferred to use a defoamer or antifoam in an amount of about 0.05 to 0.25 weight percent; more preferred is about 0.1 to 0.25 weight percent. Biocides are typically present in an amount of from 0 to about 1 weight percent. Waxes are especially useful in certain ink compositions, especially overprints, and such inks typically contain at least 0.01 weight percent of one or more of said waxes.

As appreciated in the art, the exact components and properties of components desired for any given ink application can vary, and, therefore, routine experimentation may be required to determine the optional components and proportions of components for a given application and desired properties.

Of course, it is contemplated that two or more of any of the components (A) through (C) of the ink compositions of the present invention can be employed. In addition, for safety reasons it is preferred that the inks of the present invention have a flash point of more than about 100° F.

It is preferred that the ink composition is printed onto a substrate such as metal foil, newsprint, bleached and unbleached Kraft paper, clay coated paper, glass, calendered paper, stainless paper, paper board, and films or other substrates of polyester, polycarbonate, cellulose ester, regenerated cellulose, poly(vinylidene chloride), polyamide, polypropylene, polyethylene or polystyrene;

The ink compositions of this invention can be for any of the typical ink applications such as flexographic, gravure, letterpress, ink-jet, or screen-process printing applications. The ink compositions of the present invention have excellent adhesion to a wide variety of substrates including plastic films such as polyester; aluminum foil; glass; and paper.

The ink compositions of the present invention generally have a pH of about 8.2 or lower; preferred is a pH of about 5 to 8. If the pH is higher than about 8.2, there is a danger of the polymer(s) hydrolyzing which can result in gelling of the system under certain circumstances.

The polyester material can be dispersed in water or aqueous solution using the techniques described herein or known in the art and then blended with the other components. The following general procedure can be used for dispersing the polyester in water: The water should be preheated from about 140° F. (60° C.) to about 200° F. (93.33° C.) and the polyester in pellet form is added rapidly to the vortex under high shear stirring. A Cowles Dissolver, Waring Blender, or similar equipment may be used. Depending upon the volume prepared, dispersion of the pellets should be complete within about 15 minutes to about 2 hours with agitation.

It may be desirable to add the total amount of polyester in portions over a period of time. Continued agitation with cooling may be desirable to prevent thickening at the surface due to water evaporation. Viscosities of the dispersions remain low up to polyester levels of 25 percent to 30 percent and viscosities increase sharply above these levels. Viscosities of the dispersions will be influenced by the degree of polymer dispersion obtained which is affected by the dispersing temperature, shear, and time. The polyester content typically may range from about 15 percent to about 50 percent by weight of the aqueous dispersion with the preferred for most applications being from about 26 percent to about 38 percent.

The inks, overprints, and primers of this invention can be prepared, for example, as disclosed in U.S. Pat. No. 4,148,779, which is incorporated herein by reference in its entirety. For example, the printing ink, overprint, or primer may be prepared as follows: The pigment is added to the polymer dispersion and, at a properly adjusted viscosity, dispersed there into with ball mill, sand mill, high-shear fluid flow mill, Cowles Dissolver, Kady Mill or the like. The pigments also may be dispersed directly in the polymer by milling on a heated two-roll mill at about 220° to 360° F. (104.44° to 182.22° C.) and using processing aids as desired, such as solvents or plasticizers. The viscosity and printing characteristics of the ink composition may be modified further by addition of water, solvents, plasticizers, sequestered wax, surfactants, and the like to suit the particular printing needs. The amounts and nature of these optional additives have been previously described herein.

The present invention is not limited to any type of colorant and can accommodate any pigment or disperse dye which can be dispersed, milled, mixed, blended or dissolved in any manner in either the polyester, water, or aqueous polymer system.

Exemplary useful C.I. pigments for use in the present invention are given in the following table:

| | Pigments |
|---|---|
| Generic Name | C.A. Index/Chemical Name |
| C.I. Pigment Yellow 17 | Butanamide, 2,2'-[(3,3'-dichloro[1,1'-biphenyl]-4,4'-diyl)bis(azo)bis[N-(2 methoxyphenyl)-3-oxo- |
| C.I. Pigment Blue 27 | Ferrate (4-1), hexakis (cyano-C)-ammonium iron (3+)(1:1:1) |
| C.I. Pigment Red 49:2 | 1-Naphthalenesulfonic acid, 2-[(2-hydroxy-1-naphthalenyl)azo]-, calcium salt (2:1) |
| C.I. Pigment Red 81:1 | Benzoic acid, 2,-[6-ethylamino)-3-(ethylimino) 2,7-dimethyl-3H-xanthen-9-yl]-,ethyl ester, w/molybdenum tungsten hydroxide oxide phosphate |
| C.I. Pigment Red 81:3 | Benzoic acid, 2-[6-ethylamino)-3-ethylimino)-2,7-dimethyl-3H-xanthen-9-yl],ethyl ester, molybdatesilicate |
| C.I. Pigment Red 81:x | Benzoic acid, 2-[6-(ethyl amino)-3-(ethylimino)-2,7-dimethyl-3H-xanthen-9-yl]-ethyl ester, molybdatephosphate |
| C.I. Pigment Yellow 83 | Butanamide, 2,2'-[(3,3'-dichloro[1,1'-biphenyl]-4,4'-diyl)bis(azo)bis]N(4- |

-continued

Pigments

| Generic Name | C.A. Index/Chemical Name |
|---|---|
| C.I. Pigment Red 57:1 | chloro-2,5-dimethoxy-phenyl)-3-oxo-2-Naphthalenecarboxylic acid, 3-hydroxy-4-[(4-methyl-2-sulfophenyl)azo], calcium salt (1:1) |
| C.I. Pigment Red 49:1 | 1-Naphthalenesulfonic acid, 2-[(2-hydroxy-1-naphthalenyl)azo]-, barium salt (2:1) |
| C.I. Pigment Violet 23 | Diindolo[3,3',2'm] triphenodioxazine, 8,18-dichloro-5,15-diethyl-5,15-dihydro- |
| C.I. Pigment Green 7 | C.I. Pigment Green 7 |
| C.I. Pigment Blue 61 | Benzenesulfonic acid, [[4-[[4-phenylamino)phenyl]-[4-(phenylimino)-2,5-cyclo-hexadien-1-ylidene]methyl]-phenyl]amino]- |
| C.I. Pigment Red 48:1 | 2-Naphthalenecarboxylic acid, 4-[(5-chloro-4-methyl-2-sulfophenyl)azo]3-hydroxy-, barium salt (1:1) |
| C.I. Pigment Red 52:1 | 2-Naphthalenecarboxylic acid, 4-[(4-chloro-5-methyl-2-sulfophenyl)azo] 3-hydroxy, calcium salt (1:1) |
| C.I. Pigment Violet 1 | Ethanaminium, N-[9-(2-carboxyphenyl)-6-(diethylamino)-3H-xanthen-3-ylidene]-N-ethyl-, molybdatetungstatephosphate |
| C.I. Pigment White 6 | Titanium oxide (TiO$_2$) |
| C.I. Pigment Blue 15 | Copper, [29H, 31H phthalocyaninato (2-)N$^{29}$, N$^{30}$, N$^{31}$, N$^{32}$]-, (Sp-4-1)- |
| C.I. Pigment Yellow 12 | Butanamide, 2,2'-[(3,3' dichloro[1,1'-biphenyl]-4,4'-diyl)bis(azo)]bis[3-oxo-N-phenyl- |
| C.I. Pigment Blue 56 | Benzenesulfonic acid, 2-methyl-4-[[4-[[4-[(3-methylphenyl)amino]phenyl]-[4-[(3-methylphenyl)-imino]-2,5-cyclohexadien-1-ylidene]methyl]phenyl] amino]- |
| C.I. Pigment Orange 5 | 2-Naphthalenol, 1-[(2,4-dinitrophenyl)azo]- |
| C.I. Pigment Black 7 | Carbon black |
| C.I. Pigment Yellow 14 | Butanamide, 2,2'-[(3,3'-dichloro[1,1'-biphenyl]-4,4'-diyl)bis(azo)]bis[N-(2-methylphenyl)-3-oxo- |
| C.I. Pigment Red 48:2 | 2-Naphthalenecarboxylic acid, 4-[(5-chloro-4-methyl-2-sulfophenyl)azo]-3-hydroxy-, calcium salt (1:1) |
| C.I. Pigment Blue 15:3 | Copper, [29H, 31H-phthalocyaninato (2-)-N$^{29}$, N$^{30}$, N$^{31}$, N$^{32}$]-, (SP-4-1) |
| C.I. Pigment Yellow 1 | Butanamide, 2-[(4-methyl-2-nitrophenyl)azo]-3-oxo-N-phenyl- |
| C. I. Pigment Yellow 3 | Butanamide, 2-[(4-chloro-2-nitrophenyl)azo]-N-(2-chlorophenyl)-3-oxo- |
| C. I. Pigment Yellow 13 | Butanamide, 2,2'-[(3,3'-dichloro[1,1'-biphenyl]-4,4'-diyl)bis(azo)bis[N-2,4-dimethylphenyl)-B-oxo- |
| C.I. Pigment Orange 16 | Butanamide, 2,2'-[(3,3'-dimethoxy[1,1'-biphenyl]-4,4'-diyl)bis(azo)]bis[3-oxo-N-phenyl- |
| C.I. Pigment Yellow 55 | Butanamide, 2,2'-[(3,3'- |

-continued

Pigments

| Generic Name | C.A. Index/Chemical Name |
|---|---|
| C.I. Pigment Red 41 | dichloro[1,1'-biphenyl]-4,4'-diyl)bis(azo)]bis[N-(4-methylphenyl)-3-oxo-3H-Pyrazol-3-one,4,4'-[(3,3'-dimethoxy[1,1'-biphenyl]-4,4"-diyl)bis-(azo)]bis[2,4-dihydro-5-methyl-2-phenyl- |
| C.I. Pigment Orange 34 | 3H-Pyrazol-3-one,4,4'-[(3,3'-dichloro[1,1'-biphenyl]-4,4'-diyl)bis-(azo)]bis[2,4-dihydro-5 methyl-2-(4-methylphenyl)- |
| C.I. Pigment Blue 62 | 4,4'-Bis(diethylamino) benzophenone condensed with N-ethyl-1-naphthylamine in toluene with phosphorous oxychloride and converted to the copper ferrocyanide salt (PTMA salt in P.Blue 1) |
| C.I. Pigment Red 22 | 2-Naphthalenecarboxamide, 3-hydroxy-4-[(2-methyl-5-nitrophenyl)azo]-N-phenyl- |
| C.I. Pigment Red 170 | 2-Naphthalenecarboxamide, 4-[[(4-(aminocarbonyl) phenyl]azo]-N-(2-ethoxy-phenyl)-3-hydroxy- |
| C.I. Pigment Red 88 | Benzo[b]thiophen-3(2H)-one, 4,7-dichloro-2-(4,7-dichloro-3-oxobenzo-[b]thien-2(3H)-ylidene)- |
| C.I. Pigment Yellow 151 | A diazotized aniline derivative coupled with an acetoacetyl derivative of 5-aminobenzimidazolone |
| C.I. Pigment Red 184 | A diazotized substituted aniline coupled with a derivative of 3-hydroxy-2-naphthanilide |
| C.I. Pigment Blue 1:2 | Ethanaminium, N-[4-[[4-(diethylamino)phenyl][4-(ethylamino)-1-1 naphthalenyl]methylene]-2,5-cyclohexadien-1-ylidene]-N-ethyl-, ]orthosilicate(4-)] hexa-triacontaoxododeca-molybdate(4)-(4:1) |
| C.I. Pigment Red 3 | 2-Naphthalenol, 1 [(4-methyl-2-nitrophenyl)azo]- |
| C.I. Pigment Blue 15:1 | Copper, [29H, 32H-phthalocyaninato(2-)-N$^{29}$, N$^{30}$, N$^{31}$, N$^{32}$]-,(SP-4-1)- or Copper, [chloro-29H, 31H-phthalocyaninato (2-1)-N$^{29}$, N$^{30}$, N$^{31}$, N$^{32}$]- |
| C.I. Pigment Red 23 | 2-Naphthalenecarboxamide, 3-hydroxy-4 [2-methoxy-5-nitrophenyl)azo]-N-(3-nitrophenyl)- |
| C.I. Pigment Red 112 | 2-Naphthalenecarboxamide, 3-hydroxy-N-(2-methyl-phenyl)-4-[(2,4,5-trichlorophenyl)azo]- |
| C.I. Pigment Yellow 126 | A tetrazotized derivative of 3,3-dichlorobenzidene coupled with a derivative of acetoacetanilide |
| C.I. Pigment Red 169 | 3-Ethylamino-p-cresol condensed with phthalic anhydride, esterified with ethanol and a mineral acid, and converted to the copper ferrocyanide complex (chloride salt is C.I. Basic Red 1, PTMA salt is P.Red 81:1). |
| C.I. Pigment Orange 13 | 3H-Pyrazol-3-one, 4,4'- |

-continued

| Pigments | |
|---|---|
| Generic Name | C.A. Index/Chemical Name |
| | [3,3'-dichloro [1,1'-biphenyl]-4,4'-diyl)bis-(azo)]bis[2,4-dihydro-5-methyl-2-phenyl- |
| C.I. Pigment Red 10 | 2-Naphthalenecarboxamide, 4-[(2,5-dichloro-phenyl)-azo]-3-hydroxy-N-(4-methylphenyl)- |
| C.I. Pigment Blue 1:X | Ethanaminium, N-[4-[[4-(diethylamino)phenyl][4-(ethylamino)-1-naphthalenyl]methylene]2,5-cyclohexadien-1-ylidene] N-ethyl-, molybdate-phosphate |
| C.I. Pigment Yellow 42 | Iron oxide ($Fe_2O_3$) hydrate |
| C.I. Pigment Red 101 | Iron oxide ($Fe_2O_3$) |
| C.I. Pigment Brown 6 | Iron oxide ($Fe_2O_3$), some FeO and $Fe_2O_3.H_2O$ |
| C.I. Pigment Brown 7 | Iron oxide ($Fe_2O_3$) plus varying amounts of clay |
| C.I. Pigment Brown 7:X | $Fe_2O_3$ . X $MnO_2$ with varying amounts of clay |
| C.I. Pigment Black 11 | $FeO.Fe_2O_3$ |
| C.I. Pigment Metal 1 | Aluminum |
| C.I. Pigment Metal 2 | Copper, zinc |

Other useful pigments, in addition to those specifically identified above, include those described in NPIRI Raw Materials Data, Vol. 4, Pigments (1983).

Inks prepared using the polyesters of the present invention have improved water resistance properties on certain substrates, e.g., certain metals such as aluminum foil and plastics such as poly(ethylene terephthalate), as compared with inks prepared using polyesters made as specifically disclosed in the prior art. In addition, inks prepared using the polyesters of the present invention also exhibit improved block resistance properties as compared to prior art inks.

Typically, concerning water resistance, the ink compositions of the present invention, when printed onto an aluminum substrate and/or other non-porous substrate, have a water resistance value of at least 3, preferably 4, at 1, 5 and/or 20 minutes of water contact. Water resistance values are determined according to the methodology described in the Examples section of this disclosure.

Typically, concerning block resistance, the ink compositions of the present invention, when printed onto clay coated paper, have a block resistance rating of at least 3, preferably 4, when evaluated at 110°, 120°, 130°, and/or 140° F. Block resistance values are determined in accordance with the methodology described in the Examples section of this disclosure.

The following examples are to illustrate the invention but should not be interpreted as a limitation thereon. All percentages are by weight unless indicated otherwise.

EXAMPLES

Preparation of Polymers

The polymers prepared are copolyesters from isophthalic acid (I), 5-sodiosulfoisophthalic acid (SIP), diethylene glycol (DEG), and 1,4-cyclohexanedimethanol (CHDM). The starting compounds used to form acid moieties can be present as either the acid, dimethyl ester, diethylene glycol esters, or other suitable esters (e.g., ethyl, mixed DEG, CHDM) or that can be reacted with the glycols and the subsequent reaction product either removed or incorporated into the system as the DEG diester would be (see U.S. Pat. Nos. 3,546,008; 3,734,874; and 3,779,993). Also other cations could be substituted for Na on the sulfonate as outlined in U.S. Pat. Nos. 3,546,008; 3,734,874; and 3,779,993. Generally, typical catalysts used for esterification, ester exchange, and polyesterification can be used in the polymer preparation (see U.S. Pat. Nos. 3,546,008; 3,734,874; and 3,779,993). The polymers are prepared by conventional polyesterification methods.

Examples of Polymer Preparation:

Method 1:

0.5 Mole of polymer is prepared in the laboratory by the following technique. A polymer is prepared with acid components consisting of 97 mole % isophthalic acid and 3 mole % 5-sodiosulfoisophthalic acid, glycol of 54 mole % diethylene glycol and 46 mole % 1,4-cyclohexanedimethanol (cis/trans ratio of about 35/65). The following are weighed directly into a 500 ml roundbottom flask or are weighed and transferred:

EXAMPLE 1 (COMPARATIVE)

80.51 g (0.485 mole) isophthalic acid
4.02 g (0.015 mole) 5-sodiosulfoisophthalic acid
54.06 g (0.51 mole) diethylene glycol
37.44 g (0.26 mole) 1,4-cyclohexanedimethanol
0.123 g (0.0015 mole) anhydrous sodium acetate
1.02 ml (100 ppm) titaniumtetraisopropoxide catalyst A stainless steel stirrer shaft and blade were used to stir the system to facilitate reaction and removal of volatiles. A Belmont metal bath placed in a heating mantle connected to a temperature controller was used as the heating medium. The system was purged with nitrogen and kept under a $N_2$ blanket during the run. Dry ice traps were used to collect volatiles. An oil based vacuum pump was used to place the system under reduced pressure for molecular weight buildup after the esterification stage.

The bath was heated to 220° C. and the flask and contents were inserted in the bath and stirred for 80 minutes. The temperature was increased to 265° C. over about a 10 minute period and the system was placed under reduced pressure over 5 minutes time (<10 mm torr) and held for 10 minutes. The system was returned to the nitrogen purge, the polymer was cooled and removed from the flask and ground. The polymer had an I.V. (inherent in 60/40 phenol/tetrachloroethane) of 0.296. Analysis by nuclear magnetic resonance spectroscopy (NMR) showed a composition of 3 mole % 5-sodiosulfoisophthalic acid, 97 mole % isophthalic acid, 47 mole % 1,4-cyclohexanedimethanol and 53 mole % diethylene glycol. The polymer had a second cycle glass transition temperature of 40° C. by differential scanning calorimetry (DSC).

EXAMPLE 2 (COMPARATIVE)

Similar equipment was used to prepare a polymer with a target composition of 90 mole % isophthalic acid, 10 mole % 5-sodiosulfoisophthalic acid, 60 mole % cyclohexanedimethanol and 40 mole % diethylene glycol. The following components were used:

87.30 g (0.450 mole) dimethyl isophthalate
14.80 g (0.050 mole) dimethyl 5-sodiosulfoisophthalate
45.36 g (0.315 mole) 1,4-cyclohexanedimethanol
42.40 g (0.400 mole) diethylene glycol
0.410 g (0.005 mole) anhydrous sodium acetate
0.75 cc (75 ppm) titanium tetraisopropoxide catalyst solution at 1.45% Ti The materials were charged to the flask and heated at 200° C. for about 1 hour, the temperature was increased to 240° C. and held for about 30 minutes, the temperature was then increased to 280° C. and the system was placed under <1.0 mm Hg pressure and held for 25-30 minutes. The polymer had an inherent viscosity of 0.405 and a composition by NMR of 10.9 mole % 5-sodiosulfoisophthalate and 89.1 mole % isophthalic acid; the glycols were analyzed as 43.7 mole % diethylene glycol and 56.3 mole % 1,4-cyclohexanedimethanol. The polymer had a second cycle glass transition temperature of 58.5° C. by DSC analysis.

Method 2:

Polymers could also be prepared in larger quantities in stainless steel batch process equipment in a pilot facility. An example of such a preparation is outlined below. The following were charged to a stirred reactor:

EXAMPLE 3 (COMPARATIVE)

9.40 lbs isophthalic acid
212.86 g 5-sodiosulfoisophthalic acid
6.19 lbs diethylene glycol
4.25 lbs 1,4-cyclohexanedimethanol
27.0 g titanium tetraisopropoxide in n-butanol
5.90 g sodium acetate The materials were placed under N$_2$ purge and then heated to 230° C. and held for 1.5 hours. The temperature was increased to about 265° C. and placed under <4000 microns pressure for about 20 minutes. The molten polymer was extruded and cooled in dry ice. The resulting product had an I.V. of 0.40 and a composition by NMR of 2.6 mole % 5-sodiosulfoisophthalic acid and 97.4 mole % isophthalic acid; 46.2 mole % 1,4-cyclohexanedimethanol and 53.8 mole % diethylene glycol. The second cycle glass transition temperature was 41° C.

EXAMPLE 4

Using the same type reactor as in Method 2, Example 3, the following materials were charged to the reactor:
8.65 lbs isophthalic acid
2.57 lbs of the diethylene glycol diester of 5-sodiosulfoisophthalic acid at 46.5 weight percent in diethylene glycol
7.39 lbs 1,4-cyclohexanedimethanol
20.09 g of titanium tetraisopropoxide in n-butanol (2.54 weight percent Ti)
10.21 g of anhydrous sodium acetate The temperature of the heating medium was increased to 255° C. and held for 1 hour. The temperature of the heating medium was increased to 285° C. and the system was placed under <4000 microns pressure and held for 20 minutes. The polymer was extruded and cooled. The polymer had an I.V. of 0.43 and a composition by NMR of 5.5 mole % 5-sodiosulfoisophthalic acid and 94.5 mole % isophthalic acid; 79.3 mole % 1,4-cyclohexanedimethanol and 20.7 mole % diethylene glycol. The second cycle glass transition temperature by DSC was 67.7° C.

Using similar reaction conditions but varying the ratio of the components to achieve a different composition, the polymers shown below were prepared:

| Example | IPA | 5-Sodiosulfo- isophthalic Acid | CHDM | DEG | I.V. | Tg (°C.) |
|---|---|---|---|---|---|---|
| 5 | 97.2 | 2.8 | 82.7 | 17.3 | 0.42 | 67 |
| 6 | 92.9 | 7.1 | 82.0 | 18.0 | 0.36 | 69 |
| 7 | 94.2 | 5.8 | 71.7 | 28.3 | 0.44 | 61 |
| 8 | 93.5 | 6.5 | 71.4 | 28.6 | 0.44 | 62 |

Method 3:

In addition to batch process reactors, the polymers can also be prepared in conventional continuous unit pilot plant or production equipment. Polymer with the following composition was obtained on such equipment.

| Example | IPA | 5-Sodiosulfo- isophthalic Acid | CHDM | DEG | I.V. | Tg (°C.) |
|---|---|---|---|---|---|---|
| 9 | 89.1 | 10.9 | 71.1 | 28.9 | 0.375 | 54.7 |
| 10 | 90.7 | 9.3 | 75.2 | 24.8 | 0.352 | 66.8 |

Preparation of Dispersions:

The polymer systems can be dispersed in a solvent system consisting mainly of water but generally a cosolvent such as n-propanol or i-propanol is needed to obtain % solids of 20-35%. The amount of cosolvent required to disperse the polymers depends on the polymer composition, but generally all the polymers can be dispersed in refluxing (3:1 H$_2$O:n-propanol). Azeotrope can be removed to give a lower percent alcohol and higher percent solids.

EXAMPLE 11

20.0 Grams of n-propanol and 60.0 g distilled water were weighed into a three-necked flask. The sample was heated to reflux (about 88° C.) and 20 g of polymer (having a composition of 96 mole % isophthalic acid, 4 mole % 5-sodiosulfoisophthalic acid, 76 mole % cyclohexanedimethanol, and 24 mole % diethylene glycol) was introduced and the dispersion was stirred at reflux for 1 hour. A still head condenser was then used to remove 32 ml of azeotrope to give a dispersion with <2% n-propanol and about 28% solids.

EXAMPLE 12

128.8 Grams distilled water and 42.5 g n-propanol were charged to a flask and heated to reflux. 60.0 Grams of polymer (93% I, 7% 5-sodiosulfoisophthalate, 15 mole % diethylene glycol, 85 mole % 1,4-cyclohexanedimethanol) was introduced and the dispersion was stirred at reflux for 1 hour. 36.2 Grams of distillate was removed to give a final dispersion containing 30% polymer solids and 10% n-propanol.

EXAMPLE 13

12.0 Grams distilled water and 2.0 g n-propanol were placed in a flask and heated to reflux in boiling water using a magnetic stir bar and stirrer hot plate. 6.0 Grams of polymer (91 mole % I, 9 mole % 5-sodiosulfoisophthalate, 25 mole % diethylene glycol, and 75 mole % 1,4-cyclohexanedimethanol). The dispersion was stirred one hour, a thin, slightly opaque dispersion was obtained with theoretical 30% polymer solids and 10% n-propanol.

EXAMPLE 14

19,905 Grams of distilled water and 6,435 g n-propanol were charged to a 50-liter flask and stirred and heated to reflux (about 88° C.). 9,085 Grams of polymer (Example 9) was charged as rapidly as possible to the flask via a funnel on the side arm. The dispersion was allowed to return to reflux and was boiled and stirred for 1 hour. The system was cooled 10° C. and then charged to accept a take-off receiver.

The system was heated again to reflux and 4743.6 g (5477.7 ml) was removed. The sample was cooled and filtered through a coarse screen. The dispersion contained 29.7% solids and 9.61% n-propanol.

The method shown in Example 12 was used to prepare dispersions of the following polymers at 30% solids and 10% n-propanol.

| Dispersion Example | Polymer Example | Polymer Target Composition, Mole % | | | |
|---|---|---|---|---|---|
| | | IPA | 5-Sodiosulfo-isophthalic Acid | CHDM | DEG |
| 15 | 5 | 97 | 3 | 85 | 15 |
| 16 (Comparative) | 3 | 97 | 3 | 46 | 54 |
| 17 | 4 | 95 | 5 | 85 | 15 |
| 18 | 7 | 95 | 5 | 70 | 30 |
| 19 | 6 | 93 | 7 | 85 | 15 |
| 20 | 8 | 93 | 7 | 70 | 30 |
| 21 (Comparative) | 2 | 90 | 10 | 60 | 40 |
| 22 | 10 | 91 | 9 | 75 | 25 |

A method similar to Example 12, except scaled up to 50-liter size, was used to prepare the following dispersion at 10% n-propanol, 30% solids:

| | | | | | |
|---|---|---|---|---|---|
| 23 | 9 | 91 | 9 | 75 | 25 |

Preparation of Inks

EXAMPLE 24

An ink was prepared from a dispersion similar to Example 12 from a polymer with a composition essentially equivalent to Polymer Example 6. The ink consisted of 9.1 weight percent of a blue millbase [which contained 24 weight percent Pigment CI 15:3 (phthalocyanine blue)] and a dispersion of experimental polymer to give 15 weight percent Polymer Example 3 and 5% binder resin from the millbase, 6.7% n-propanol, 0.6% Acrysol RM, and 0–2% Ektasolve EB, remainder as water to give 100%. By standard test methods the polymer had good water and block resistance.

EXAMPLE 25

An ink was prepared from a dispersion similar to Dispersion Example 12 from a polymer with a composition essentially equivalent to Polymer Example 3. The ink consisted of 15.0 weight percent blue millbase [which contained 24 weight percent Pigment CI 15:3 (phthalocyanine blue)] and a dispersion containing Polymer Example 2 to give 7.5 weight percent polymer (additional 7.5% binder resin from millbase), 2.6 weight percent n-propanol, 1.1% Acrysol RM-825, remainder water or water and Ektasolve EB. The resulting ink gave good water resistance and poor block resistance.

Comparison of Film Properties of the Dispersions

Samples of the dispersions as prepared above containing various polymers were drawn down on aluminum foil (Reynolds Wrap) and on clay coated paper using a Pamarco Anilox Rolls Gravure Type Hand Proofer (180 lines/inch). The foil samples were placed in a forced air oven at 100° C. for 3 seconds. As a test for water resistance, the samples on foil were dotted with drops of distilled water which were wiped with a Kleenex® paper tissue after 1, 5, and 20 minutes. The degree to which the film was removed was designated as 4—no removal, 313 staining or whitening but essentially no film removal, 2—partial film removal, 1—total film removal. The materials drawn down of clay coated paper were tested for block resistance. The samples were folded such that the film was in contact with itself (face-to-face). The samples were then placed in a Sentinel Heat Sealer and held at various temperatures for 5 seconds at 40 psi. The temperature was increased in 10° F. intervals from 100°–140° F. The samples were then pulled apart and rated for blocking according to the following scale: 4—no sticking, 3—sticking but no picking, 2—partial picking, 1—total picking. The results are summarized in Table 1.

These data show the surprising result that samples below about 9–10 mole % 5-sodiosulfoisophthalic acid and below about 30 mole % diethylene glycol have superior water and block resistance.

TABLE 1

Effect of Composition on the Water[b] and Block Resistance[c] of Water Dispersible Polyesters[a] Containing Isophthalic Acid, 5-Sodiosulfoisophthalic Acid, Diethylene Glycol, 1,4-Cyclohexanedimethanol

| Polymer Example | Target Composition | | | | Analyzed Composition (NMR) | | | | Water Resistance | | | Block Resistance (°F.) | | | | |
|---|---|---|---|---|---|---|---|---|---|---|---|---|---|---|---|---|
| | IPA | SIP | DEG | CHDM | IPA | SIP | DEG | CHDM | 1 Min | 5 Min | 20 Min | 100 | 110 | 120 | 130 | 140 |
| 5 | 97 | 3 | 15 | 85 | 97.2 | 2.8 | 17.3 | 82.7 | 4 | 4 | 4 | 4 | 4 | 4 | 4 | 3 |
| 3[d] | 97 | 3 | 54 | 46 | 97.4 | 2.6 | 53.8 | 46.2 | 4 | 3 | 3 | 4 | 2 | 1 | | |
| 4 | 95 | 5 | 15 | 85 | 94.5 | 5.5 | 20.7 | 79.3 | 4 | 4 | 4 | 4 | 4 | 4 | 4 | 3 |
| 7 | 95 | 5 | 30 | 70 | 94.2 | 5.8 | 28.3 | 71.7 | 4 | 4 | 4 | 4 | 4 | 4 | 4 | 2 |
| 6 | 93 | 7 | 15 | 85 | 92.9 | 7.1 | 18.0 | 82.0 | 4 | 4 | 4 | 4 | 4 | 4 | 4 | 3 |
| 8 | 93 | 7 | 30 | 70 | 93.5 | 6.5 | 28.6 | 71.4 | 4 | 3 | 2 | 4 | 4 | 4 | 4 | 3 |
| 2[d] | 90 | 10 | 40 | 60 | 89.1 | 10.9 | 43.7 | 56.3 | 2 | 2 | 2 | 4 | 4 | 4 | 3 | 3 |
| 9 | 91 | 9 | 25 | 75 | 89.1 | 10.9 | 28.9 | 71.1 | 4 | 4 | 4 | 4 | 4 | 4 | 4 | 3 |
| 2[d] | 90 | 10 | 40 | 60 | 89.1 | 10.9 | 43.7 | 56.3 | 4 | 2 | 2 | 4 | 4 | 3 | 3 | 1 |

TABLE 1-continued

Effect of Composition on the Water[b] and Block Resistance[c] of Water Dispersible Polyesters[a] Containing Isophthalic Acid, 5-Sodiosulfoisophthalic Acid, Diethylene Glycol, 1,4-Cyclohexanedimethanol

| Polymer Example | Target Composition | | | | Analyzed Composition (NMR) | | | | Water Resistance | | | Block Resistance (°F.) | | | | |
|---|---|---|---|---|---|---|---|---|---|---|---|---|---|---|---|---|
| | IPA | SIP | DEG | CHDM | IPA | SIP | DEG | CHDM | 1 Min | 5 Min | 20 Min | 100 | 110 | 120 | 130 | 140 |
| 10 | 91 | 9 | 25 | 75 | 90.7 | 9.3 | 24.8 | 75.2 | 4 | 4 | 4 | 4 | 4 | 4 | 3 | 1 |

[a]Aqueous dispersions were prepared from the polymers to about 30% solids and about 10% n-propanol according to Dispersion Example 12. Films were made by drawing down the dispersions with a Pamarco Anilox Rolls Gravure type hand proofer (180 lines/inch).
[b]For the water resistance test the samples were drawn down on aluminum foil (Reynolds Wrap) and placed in a forced air oven at 100° C. for 3 seconds. The films were then dotted with deionized water and wiped off with a tissue after 1, 5, and 20 minutes. Ratings were given as follows:
  1 - total film removal
  2 - partial film removal
  3 - staining of the film surface but essentially no removal
  4 - film unchanged—no staining or removal
[c]For the block resistance test the samples were drawn down on clay coated paper. The samples were then folded so that the film was in contact with itself (face-to-face). The samples were then placed on a Sentinel heat sealer at various temperatures and held for 5 seconds at 40 psi. Ratings were given as follows:
  1 - severe picking
  2 - partial picking
  3 - sticking but no picking
  4 - no sticking or picking
[d]Comparative

TABLE 2

Analysis of Dispersion Used for Evaluations (See Table 1)

| Polymer Example | Dispersion Example | % Solids (wt./wt.) | % n-Propanol |
|---|---|---|---|
| 5 | 15 | 33.5 | 6.26 |
| 3 | 16 | 30.7 | 8.39 |
| 4 | 17 | 30.4 | 8.38 |
| 7 | 18 | 30.9 | 8.32 |
| 6 | 19 | 31.9 | 6.76 |
| 8 | 20 | 30.5 | 9.03 |
| 2 | 21 | 32.8, 32.7 | 4.98, 3.76 |
| 9 | 23 | 29.7 | 9.61 |
| 10 | 22 | 30.2 | 8.96 |

We claim:

1. A linear, water-dissipatable polyester having an inherent viscosity of at least about 0.1 as measured in a 60/40 parts by weight solution of phenol/tetrachloroethane at 25° C. and at a concentration of 0.5 gram of polyester in 100 ml of solvent, the polyester containing substantially equimolar proportions of acid moiety repeating units (100 mole %) to hydroxy moiety repeating units (100 mole %), the polyester comprising repeating units of components (a), (b), (c) and (d), as follows wherein all stated mole percentages are based on the total of all acid and hydroxy moiety repeating units being equal to 200 mole %:
  (a) about 90 to about 97 mole % isophthalic acid,
  (b) about 3 to about 10 mole % 5-sulfoisophthalic acid,
  (c) about 70 to about 85 mole % 1,4-cyclohexanedimethanol, and
  (d) about 15 to about 30 mole % diethylene glycol.

2. The polyester of claim 1 wherein component (b) is in the form of a sodium salt.

3. The polyester of claim 1 wherein component (a) is about 91 mole % isophthalic acid, component (b) is about 9 mole % 5-sodiosulfoisophthalic acid, component (c) is about 75 mole % 1,4-cyclohexanedimethanol, and component (d) is about 25 mole % diethylene glycol.

4. The polyester of claim 1 wherein component (a) is about 93 mole % isophthalic acid, component (b) is about 7 mole % 5-sodiosulfoisophthalic acid, component (c) is about 70 mole % 1,4-cyclohexanedimethanol, and component (d) is about 30 mole % diethylene glycol.

5. The polyester of claim 1 wherein component (a) is about 93 mole % isophthalic acid, component (b) is about 7 mole % 5-sodiosulfoisophthalic acid, component (c) is about 85 mole % 1,4-cyclohexanedimethanol, and component (d) is about 15 mole % diethylene glycol.

6. The polyester of claim 1 wherein component (a) is about 95 mole % isophthalic acid, component (b) is about 5 mole % 5-sodiosulfoisophthalic acid, component (c) is about 85 mole % 1,4-cyclohexanedimethanol, and component (d) is about 15 mole % diethylene glycol.

7. The polyester of claim 1 wherein component (a) is about 95 mole % isophthalic acid, component (b) is about 5 mole % 5-sodiosulfoisophthalic acid, component (c) is about 70 mole % 1,4-cyclohexanedimethanol, and component (d) is about 30 mole % diethylene glycol.

8. The polyester of claim 1 wherein component (a) is about 97 mole % isophthalic acid, component (b) is about 3 mole % 5-sodiosulfoisophthalic acid, component (c) is about 85 mole % 1,4-cyclohexane. dimethanol, and component (d) is about 15 mole % diethylene glycol.

9. The polyester of claim 1 having an inherent viscosity of about 0.2 to about 0.6.

10. An ink or concentrate thereof comprising
  (A) about 4 to about 80 weight percent of at least one linear, water-dissipatable polyester having an inherent viscosity of at least about 0.1 as measured in a 60/40 parts by weight solution of phenol/tetrachloroethane at 25° C. and at a concentration of 0.5 gram of polyester in 100 ml of solvent, the polyester containing substantially equimolar proportions of acid moiety repeating units (100 mole %) to hydroxy moiety repeating units (100 mole %), the polyester comprising repeating units of components (1), (2), (3) and (4), as follows wherein all stated mole percentages are based on the total of all acid and hydroxy moiety repeating units being equal to 200 mole %:
    (1) about 90 to about 97 mole % isophthalic acid,
    (2) about 3 to about 10 mole % 5-sulfoisophthalic acid,
    (3) about 70 to about 85 mole % 1,4-cyclohexanedimethanol, and
    (4) about 15 to about 30 mole % diethylene glycol, (B) about 0 to about 45 weight percent of at least one colorant, and (C) about 15 to about 95 weight percent water.

11. The ink of claim 10 comprising about 5 to about 40 weight percent of component (A), 0 to about 35 weight percent of component (B), and about 35 to about 90 weight percent of component (C).

12. The ink of claim 10 additionally comprising up to about 15 weight percent of an additive.

13. The ink of claim 12 wherein said additive is selected from the group consisting of a wax, a defoamer, a surfactant, an alcohol, a glycol, an alcohol ether, a biocide, a thickener, a pH stabilizer, and a mixture thereof.

14. The ink of claim 10 containing at least about 0.5 weight percent of component (B).

15. The ink of claim 14 wherein said colorant is one or a mixture of the following color index materials: C.I. Pigment Yellow 17, C.I. Pigment Blue 27, C.I. Pigment Red 49:2, C.I. Pigment Red 81:1, C.I. Pigment Red 81:3, C.I. Pigment Red 81:x, C.I. Pigment Yellow 83, C.I. Pigment Red 57:1, C. I. Pigment Red 49:1, C.I. Pigment Violet 23, C.I. Pigment Green 7, C.I. Pigment Blue 61, C.I. Pigment Red 48:1, C.I. Pigment Red 52:1, C.I. Pigment Violet 1, C.I. Pigment White 6, C.I. Pigment Blue 15, C.I. Pigment Yellow 12, C.I. Pigment Blue 56, C.I. Pigment Orange 5, C.I. Pigment Black 7, C.I. Pigment Yellow 14, C.I. Pigment Red 48:2, C.I. Pigment Blue 15:3, C.I. Pigment Yellow 1, C.I. Pigment Yellow 3, C.I. Pigment Yellow 13, C.I. Pigment Orange 16, C.I. Pigment Yellow 55, C.I. Pigment Red 41, C.I. Pigment Orange 34, C.I. Pigment Blue 62, C.I. Pigment Red 170, C.I. Pigment Red 88, C.I. Pigment Yellow 151, C.I. Pigment Red 184, C.I. Pigment Blue 1:2, C.I. Pigment Red 3, C.I. Pigment Blue 15:1, C.I. Pigment Red 23, C.I. Pigment Red 112, C.I. Pigment Yellow 126, C.I. Pigment Red 169, C.I. Pigment Orange 13, C.I. Pigment Red 1-10, 12, C.I. Pigment Blue 1:X, C.I. Pigment Yellow 42, C.I. Pigment Red 101, C.I. Pigment Brown 6, C.I. Pigment Brown 7, C.I. Pigment Brown 7:X, C.I. Pigment Black 11, C.I. Pigment Metal 1, or C.I. Pigment Metal 2.

16. The ink of claim 10 wherein the polyester of component (A) comprises about 91 mole % isophthalic acid, about 9 mole % 5-sodiosulfoisophthalic acid, about 75 mole % 1,4-cyclohexanedimethanol, and about 25 mole % diethylene glycol.

17. The ink of claim 10 wherein the polyester of component (A) comprises about 93 mole % isophthalic acid, about 7 mole % 5-sodiosulfoisophthalic acid, about 70 mole % 1,4-cyclohexanedimethanol, and about 30 mole % diethylene glycol.

18. The ink of claim 10 wherein the polyester of component (A) comprises about 93 mole % isophthalic acid, about 7 mole % 5-sodiosulfoisophthalic acid, about 85 mole % 1,4-cyclohexanedimethanol, and about 15 mole % diethylene glycol.

19. The ink of claim 10 wherein the polyester of component (A) comprises about 95 mole % isophthalic acid, about 5 mole % 5-sodiosulfoisophthalic acid, about 85 mole % 1,4-cyclohexanedimethanol, and about 15 mole % diethylene glycol.

20. The ink of claim 10 wherein the polyester of component (A) comprises about 95 mole % isophthalic acid, about 5 mole % 5-sodiosulfoisophthalic acid, about 70 mole % 1,4-cyclohexanedimethanol, and about 30 mole % diethylene glycol.

21. The ink of claim 10 wherein the polyester of component (A) comprises about 97 mole % isophthalic acid, about 3 mole % 5-sodiosulfoisophthalic acid, about 85 mole % 1,4-cyclohexanedimethanol, and about 15 mole % diethylene glycol.

22. The ink of claim 10 wherein component (A)(2) is in the form of a sodium salt.

23. The ink of claim 10 wherein the polyester of component (A) has an inherent viscosity of about 0.2 to about 0.6.

24. The ink of claim 10 coated onto a substrate selected from the group consisting of metal foil, newsprint, bleached Kraft paper, unbleached Kraft paper, clay coated paper, glass, calendered paper, stainless paper, paper board, polyester, polycarbonate, cellulose ester, regenerated cellulose, poly(vinylidene chloride), polyamide, polyolefin, and polystyrene.

25. The ink of claim 11 coated onto a substrate selected from the group consisting of metal foil, newsprint, bleached Kraft paper, unbleached Kraft paper, clay coated paper, glass, calendered paper, stainless paper, paper board, polyester, polycarbonate, cellulose ester, regenerated cellulose, poly(vinylidene chloride), polyamide, polyolefin, and polystyrene.

26. The ink of claim 12 coated onto a substrate selected from the group consisting of metal foil, newsprint, bleached Kraft paper, unbleached Kraft paper, clay coated paper, glass, calendered paper stainless paper, paper board, polyester, polycarbonate, cellulose ester, regenerated cellulose, poly(vinylidene chloride), polyamide, polyolefin, or polystyrene.

27. The ink of claim 14 coated onto a substrate selected from the group consisting of metal foil, newsprint, bleached Kraft paper, unbleached Kraft paper, clay coated paper, glass, calendered paper, stainless paper, paper board, polyester, polycarbonate, cellulose ester, regenerated cellulose, poly(vinylidene chloride), polyamide, polyolefin, and polystyrene.

28. The ink of claim 15 coated onto a substrate selected from the group consisting of metal foil, newsprint, bleached Kraft paper, unbleached Kraft paper, clay coated paper, glass, calendered paper, stainless paper, paper board, polyester, polycarbonate, cellulose ester, regenerated cellulose, poly(vinylidene chloride), polyamide, polyolefin, and polystyrene.

* * * * *

UNITED STATES PATENT AND TRADEMARK OFFICE
CERTIFICATE OF CORRECTION

PATENT NO.  : 5,006,598
DATED       : April 9, 1991
INVENTOR(S) : Linda Jane Adams and George J. O'Neill It is certified that error appears in the above-identified patent and that said Letters Patent is hereby corrected as shown below:

Column 16, line 43, in Claim 8, the period (.) and the space between "1,4-cyclohexane" and "dime-" should be deleted.

Column 17, line 34, in Claim 15, after "C.I. Pigment Blue 62," ---C.I. Pigment Red 22--- should be inserted.

Column 18, line 40, in Claim 26, a comma (,) should be inserted after "calendered paper".

Signed and Sealed this

Eighteenth Day of August, 1992

Attest:

DOUGLAS B. COMER

*Attesting Officer*   Acting Commissioner of Patents and Trademarks

UNITED STATES PATENT AND TRADEMARK OFFICE
CERTIFICATE OF CORRECTION

PATENT NO. : 5,006,598

DATED : April 9, 1991

INVENTOR(S) : Linda Jane Adams and George J. O'Neill

It is certified that error appears in the above-identified patent and that said Letters Patent is hereby corrected as shown below:

Column 3, line 54, "$t_2$" should be ---$t_s$---.

Column 12, line 59, after "1,4-cyclohexanedimethanol)", ---was added to make a dispersion--- should be inserted.

Signed and Sealed this

Eighth Day of December, 1992

Attest:

DOUGLAS B. COMER

*Attesting Officer*   *Acting Commissioner of Patents and Trademarks*